United States Patent
Slator et al.

[15] 3,694,008
[45] Sept. 26, 1972

[54] ROTATING JOINT
[72] Inventors: Damon T. Slator; Albert L. Burns, Jr., both of Houston, Tex.
[73] Assignee: Bowen Tools, Inc.
[22] Filed: Oct. 27, 1970
[21] Appl. No.: 84,415

[52] U.S. Cl. ................................. 285/94, 285/190
[51] Int. Cl. ................................. F16l 27/00
[58] Field of Search .................. 285/190, 94, 134

[56] References Cited

UNITED STATES PATENTS

| | | | |
|---|---|---|---|
| 836,989 | 11/1906 | Oliver | 285/190 |
| 2,635,931 | 4/1953 | May | 285/190 X |
| 2,810,592 | 10/1957 | Williams | 285/94 X |
| 2,394,800 | 2/1946 | Murphy | 285/94 |
| 3,601,206 | 8/1971 | Grantom | 286/190 X |
| 2,698,192 | 12/1954 | Bily | 285/94 X |

FOREIGN PATENTS OR APPLICATIONS

| | | | |
|---|---|---|---|
| 689,932 | 4/1953 | Great Britain | 285/94 |

Primary Examiner—Thomas F. Callaghan
Attorney—Pravel, Wilson & Matthews

[57] ABSTRACT

A rotating joint for connecting a fixed pipe to a rotating pipe and for providing a fluid seal for fluid flowing through the joint, wherein the joint has a pair of spaced seals which are subjected to fluid pressure acting in the joint in opposite directions to substantially equalize the thrust on the joint by the fluid flowing therethrough.

6 Claims, 2 Drawing Figures

PATENTED SEP 26 1972 3,694,008

Damon T. Slator
Albert L. Burns, Jr.
INVENTORS

BY
Pravel Wilson & Matthews
ATTORNEYS

ROTATING JOINT

BACKGROUND OF THE INVENTION

The field of this invention is rotating joints, particularly rotating joints for connecting a fixed fluid line to a rotating drum.

In the past, rotating joints such as a "Chiksan" joint have been used for connecting a fixed pipe to a rotating pipe, or for making flexible joints between fixed pipe layouts. Although such prior joints have been satisfactory for adjustable connectors between non-rotating pipes, and for rotating joints at low fluid pressures, they have been generally unsatisfactory and even unusable at higher fluid pressure due to binding between the parts caused by the great thrust loads at the higher fluid pressures.

SUMMARY OF THE INVENTION

The present invention relates to a rotating joint for establishing a sealed connection between a pair of pipes, one of which is rotatable relative to the other, which joint has spaced seals with means for introducing the fluid between the seals to equalize the pressure thrust acting on the joint, whereby frictional binding, and thrust forces tending to cause same, are minimized so that the joint is satisfactory for use at high fluid pressures.

DESCRIPTION OF THE PREFERRED EMBODIMENT

Figure 1:
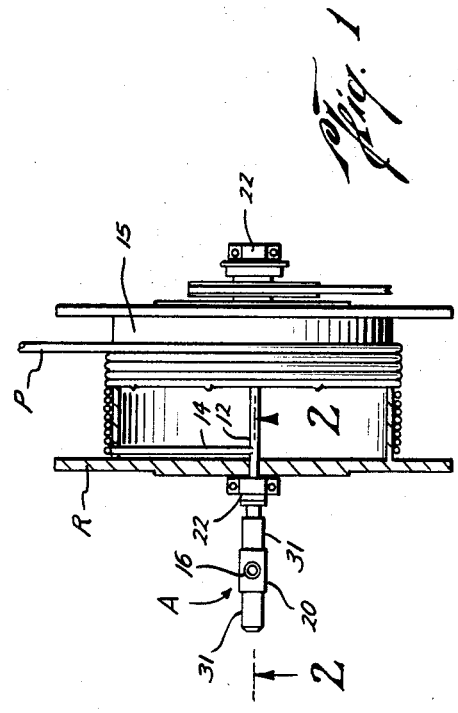
FIG. 1 is an elevation of the rotating joint of this invention, shown mounted upon a typical reel for the winding and unwinding of flexible hose or pipe thereon.

In the drawings, the letter A designates generally the rotating joint of this invention, which is preferably used with and mounted on, a rotatable reel R of any conventional construction, upon which is wound a hose or pipe P in the know manner. Briefly, the rotating joint A includes a mandrel 10 which is secured to a rotatable shaft 12 of the reel R so that the mandrel 10 rotates with the shaft 12. The shaft 12 has a pipe 14 therewith, preferably disposed internally of the drum 15 of the reel R and which connects with the hose or pipe P. A fixed inlet pipe 16 is connected to a sleeve 20 which is mounted on the mandrel 10 for relative rotation with respect thereto, so that water or other fluid may be introduced from the fixed pipe or tube 16 through the rotating joint A to the rotating pipe 14 for thus supplying the fluid to the hose or pipe P as the reel R is being rotated for either winding or unwinding the hose or pipe P with respect to the reel R.

Considering the invention more in detail, the mandrel 10 has a flange 10a at one end thereof which is adapted to engage a flange 12a on the shaft 12 to facilitate the attachment of the mandrel 10 to the shaft 12 by means of studs 11, and nuts 11a, or any other suitable attaching means. Preferably the shaft 12 is provided with an end recess 12b for receiving a projection 10b on the mandrel 10, having an O-ring 21 therebetween for providing a fluid seal between the shaft 12 and the mandrel 10.

Figure 2:
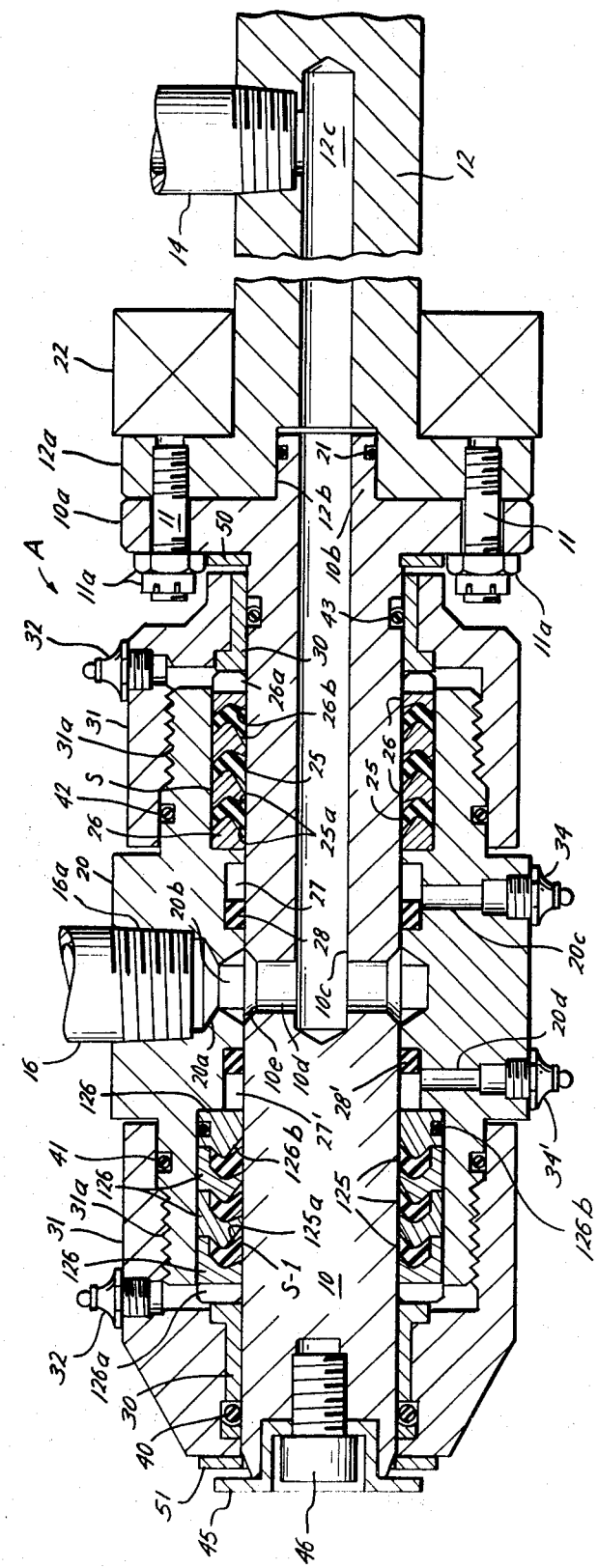
FIG. 2 is an enlarged vertical sectional view of the rotating joint of this invention.

The shaft 12 has a longitudinal passage 12c therein which is in communication with a longitudinal bore 10c in the mandrel 10, and which extends for at least a part of the length thereof. The passage 12c is also in communication with the pipe 14 (FIG. 2).

In the preferred form of the invention, the longitudinal bore 10c extends for approximately one half of the length of the mandrel 10 and is in communication with one or more radial ports 10d which are joined by an annular recess 10e at the outer peripheral surface of the mandrel 10. Normally, the annular recess 10e and the radial or lateral port 10d are disposed at an intermediate portion of the mandrel 10, preferably at about the mid-point thereof, and the bore 10c terminates outwardly of such ports 10d (FIG. 2).

The mandrel 10 thus provides an extension of the shaft 12 externally of the reel R, with the shaft 12 being mounted in suitable conventional bearings 22.

For introducing fluid, such as nitrogen gas, from the fixed pipe 16 into the rotating joint A, the sleeve 20 is provided with a radial or lateral port 20a which is adapted to receive the threads 16a. The lateral port 20a is in communication with an annular recess or groove 20b which is disposed around the annular recess 10e. Only one of such annular recesses 10e and 2b is required, so long as one of such annular recesses is in communication with a lateral port or ports in the other member.

The fixed pipe 16 and the lateral port 20a in which it is mounted is disposed at an intermediate location on the sleeve 20 with respect to a pair of longitudinally spaced seal means S and S–1. The seal means S and S–1 have been deliberately illustrated in two forms, although it should be understood that the seal means S and S–1 may be identical. The seal means S includes a plurality of resilient seal rings 25 formed of rubber or other similar material and which have rigid rings 26 on each side thereof, formed of steel or similar material. The outermost ring 26 has one or more lateral slots 26a at the right hand end thereof (FIG. 2) for the passage of grease to the inner surfaces of the rings 25 and 26, as will be more evident hereinafter. Preferably the adjacent surfaces 25a and 26b of the rings 25 and 26, respectively, are spaced apart so that the inner annular edges or surfaces of the resilient rings 25 are urged into sealing engagement with the external surface of the mandrel 10 by the fluid pressure exerted thereon from the gas flowing through the rotating joint A.

The seal means S–1, although similar to the seal means S, differs in certain respects as shown in FIG. 2 and as explained hereinafter. The seal means S–1 includes a plurality of resilient seal rings 125 made of rubber or similar material which are mounted with a plurality of rigid rings 126 formed of steel or other similar material. The outermost ring 126 has one or more lateral passages 126a through which grease may pass to the seal means S–1, as will be more evident hereinafter. An O-ring 126b is provided on the innermost ring 126 to seal between the exterior of the seal S–1 and the sleeve 20.

Bushings 30, preferably made of bronze, are disposed at each end of the sleeve 20 and each is surrounded by a retaining head 31 which serves to force the bushing 30 towards the respective seal means S or S-1 for compressing the outer portion of each of the resilient rings 25 and 125, respectively. The adjacent surfaces 125a and 126b on the adjacent rings 125 and 126, respectively, are spaced apart to facilitate the annular lip seal by the inner portion of each of the resilient rings 125 with the external surface of the mandrel 10. The space thus provided is closer to the port 20a than the opposite sides of the rings 125, with the result that sealing takes place with each of the seal rings 125 successively so that until substantial wear occurs on the first seal (the seal on the right in FIG. 2), such first seal is the only seal which is effective. Because of the successive sealing action of the seal rings 125, as compared to the substantially uniform sealing action by the seal rings 25, the life of the seal means S-1 is longer than that of the seal means S, assuming the same operating conditions and other factors.

Grease is introduced into each of the seal means S and S-1 through grease fittings 32, each of which communicates with its respective seal means. The grease fittings 32 are conventional pressure fittings which permit the introduction of grease therethrough, but which prevent the escape of grease therefrom. Thus, grease is introduced to the seal S through the fitting 32 associated therewith so that the grease passes through the opening or notch 26a and fills all of the spaces within the seal means S and then flows to an annular space 27 in which a floating seal ring 28 which is formed of rubber or similar material is disposed. The seal ring 28 is forced to the left as viewed in FIG. 2 so that the space 27 is filled with the grease. So that there will not be an air lock when filling the seal means S and the spaces therewith with the grease, a grease fitting or plug 34 which is mounted on the sleeve 20 is removed so that the grease may exit through a passage 20c, indicating to the operator that all of the spaces have been filled with grease. The fitting 34 may then be resecured as illustrated in FIG. 2 to retain the grease within the sleeve 20. The combination of the grease and the resilient rubber seal rings is significant in the present invention because the fluid which normally passes through the rotating joint is a dry gas which has no lubricating properties as such and therefore, the grease lubricates the seal rings 25 which minimizes friction between the mandrel 10 and the seal rings 25 to thereby reduce heat and wear and lengthen the life of the seal S. The same is true with respect to the seal rings 125 in the seal S-1.

A space 27' and a floating seal ring 28' which are similar to the space 27 and the floating ring 28, respectively, are employed in conjunction with the seal means S-1. Also, a grease fitting or plug 34' is provided in a passage 20d in the sleeve 20 so that grease may be introduced through the left hand grease fitting 32 (as viewed in FIG. 2), and then into the seal means S-1 to fill all of the spaces therewith, including the space 27' and the passage 20d. The fitting 34' is removed during the filling of the spaces with respect to the seal means S-1 with grease, and it is thereafter repositioned as shown in FIG. 2 for providing the closed area for such grease.

The annular space 27 and 27' are each of sufficient size to provide a reservoir of grease between the floating rings 28, 28' and the seals S, S-1, respectively, to compensate for grease loss through the sealing means S and S-1 in normal extended operation. Each of the floating rings 28, 28' is free to move axially and fits closely in the annular spaces 27, 27', respectively, between the mandrel 10 and the sleeve 20, thus, the hydrostatic pressure on the grease in the annular spaces 27, 27' is at all times essentially equal to the pressure of the fluid being circulated through the rotating joint A. In the event of gradual loss of grease through the sealing means S or S-1, or both, its respective floating ring 28 or 28' will automatically move to compensate for such loss of grease, thus effectively isolating the sealing means from the fluid being circulated until the supply of grease in each reservoir 27, 27' is exhausted. The supply of grease can be replenished even while the rotating joint is in operation, by pumping grease in through the respective fittings 34, 34' at a pressure higher than the working pressure of the fluid being circulated, displacing the floating rings 28, 28', and refilling the annular spaces 27, 27'.

Although the heads 31 are preferably threaded at 31a to the sleeve 20, they may be attached to the sleeve 20 with any other suitable means. Additional fluid seals such as O-rings 40, 41, 42 and 43 are also provided with the heads 31 to assure that leakage is prevented in proximity to the heads 31.

The sleeve 20 and the parts therewith are removable from the mandrel 10 by sliding same axially to the left as viewed in FIG. 2, but a retaining plug 45 is preferably mounted on the outer end of the mandrel 10 by means of a cap screw 46 so as to normally prevent any removal of the sleeve 20 from the mandrel 10. However, upon a removal of the cap screw 46 and the retaining plug 45, it will be appreciated that the entire sleeve 20 with its seals S and S-1 and heads 31 may be removed for the replacement or repair and for such other servicing as may be required.

In the operation or use of the rotating joint A of this invention, the joint is attached to the end of a rotating shaft such as the shaft 12, and it is also connected with a fixed pipe 16. Normally, gas such as nitrogen is introduced from a suitable source (not shown) through the pipe 16 and then through the lateral passage 20a, the annular recess 20b, the annular recess 10e, and one or more lateral passages 10d to the bore 10c of the mandrel 10. The bore 10c is in communication with the passage 12c in the shaft 12 so that the gas thus flows to the interior of a rotatable pipe 14 which rotates with the shaft 12 on the reel R.

Since the gas pressure is thus introduced into the rotating joint A between the pair of longitudinally spaced, equal area, seal means S and S-1, the force exerted by the fluid on the joint A, and particularly the sleeve 20 is equalized in both longitudinal directions so that there is substantially no binding or thrust force on the sleeve 20. Therefore, the frictional resistance to the relative rotation between the mandrel 10 and the sleeve 20 is minimized and is due essentially only to the frictional contact between the resilient rings 25 and 125 and also the floating seal rings 28 and 28'. However, since there is grease filling the spaces with respect to the seal means S and S-1, as previously explained, such frictional resistance is again minimized. The grease also facilitates the anti-friction support provided by the bushings 30 at each end of the sleeve 20. Although thrust rings 50 and 51 are provided on the rotating joint A, they are normally of little value and could be omitted since the fluid forces acting in the longitudinal directions are equalized, or are substantially equalized. Thus, any longitudinal or axial force exerted on the sleeve 20 which would cause some movement of the sleeve 20 relative to the mandrel 10 in a longitudinal or axial direction, would be relatively small and would not create any substantial binding of the parts of the joint, as compared to the prior art wherein substantially all of the thrust is in one longitudinal direction between the rotating parts.

The foregoing disclosure and description of the invention are illustrative and explanatory thereof, and various changes in the size, shape, and materials as well as in the details of the illustrated construction may be made without departing from the spirit of the invention.

We claim:

1. A rotating joint for connecting together a pair of pipes, one of which is rotatable relative to the other, for flowing fluid under high pressure therethrough, comprising:
   a mandrel having a longitudinal bore extending for at least part of the length thereof and lateral port means at an intermediate portion of the mandrel;
   a sleeve surrounding said mandrel;
   means mounting said sleeve on said mandrel for relative rotation therebetween;
   longitudinally spaced annular lip-type seal means between said mandrel and said sleeve;
   said sleeve having a fluid passage disposed between said seal means and communicating with said lateral port means to thereby establish fluid flow through the rotating joint with the pressure thereof acting substantially equally in opposite longitudinal directions
   a floating seal ring disposed on each side of said fluid passage in said sleeve between said sleeve and said mandrel, and each being located longitudinally between said fluid passage and one of said seal means;
   each of said seal rings being spaced longitudinally inwardly from the seal means therewith for providing an annular space which may also be filled with grease; and
   said sleeve having a grease injection passage for each of said seal means located longitudinally outwardly thereof on the opposite side of said seal means from said annular space and said floating seal ring whereby grease may be injected into each of said seal means and said annular space for filling all spaces with said seal means and said annular space.

2. The rotating joint set forth in claim 1, including:
   means on one end of said mandrel for attaching same to a rotatable reel shaft for rotation therewith relative to said sleeve.

3. The rotating joint set forth in claim 1, including:
   a bushing at each end of said sleeve disposed between said sleeve and said mandrel to minimize wear and facilitate relative rotation between said mandrel and said sleeve.

4. The rotating joint set forth in claim 3, including:
   a head on each end of said sleeve surrounding one of said bushings and adapted to retain same on said sleeve; and
   means for adjusting each head longitudinally on said sleeve for providing an adjustable compressive force on each seal means.

5. The rotating joint set forth in claim 1, wherein each of said seal means includes:
   a plurality of resilient seal rings, each of which has inner and outer annular lip surfaces in contact with said sleeve and said mandrel;
   a plurality of rigid rings disposed between and on each side of said resilient rings; and
   means on each end of said sleeve adjustable longitudinally for confining said resilient rings and said rigid rings as an assembly.

6. The rotating joint set forth in claim 5, wherein:
   adjacent annular surfaces on said rigid rings and resilient rings are spaced from each other, with the spaces being longitudinally disposed on the side of each resilient ring which is closer to said fluid passage so that pressure acting on each seal means acts on said resilient seal rings successively to minimize wear thereof and to prolong the overall life of each said seal means.

* * * * *